(12) United States Patent
Oishi

(10) Patent No.: US 8,605,999 B2
(45) Date of Patent: Dec. 10, 2013

(54) SIGNAL PROCESSING APPARATUS AND METHOD, NOISE REDUCTION APPARATUS AND METHOD, AND PROGRAM THEREFOR

(75) Inventor: Makoto Oishi, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 1235 days.

(21) Appl. No.: 12/112,626

(22) Filed: Apr. 30, 2008

(65) Prior Publication Data

US 2008/0273793 A1    Nov. 6, 2008

(30) Foreign Application Priority Data

May 1, 2007  (JP) ................................. 2007/120621

(51) Int. Cl.
  *G06K 9/00*  (2006.01)
  *G06K 9/40*  (2006.01)
(52) U.S. Cl.
  USPC .......................................... 382/162; 382/260
(58) Field of Classification Search
  None
  See application file for complete search history.

(56) References Cited

U.S. PATENT DOCUMENTS

| | | | |
|---|---|---|---|
| 6,229,578 B1 | 5/2001 | Acharya et al. | |
| 6,526,181 B1 * | 2/2003 | Smith et al. | 382/275 |
| 7,564,490 B2 * | 7/2009 | Ooishi | 348/241 |
| 2005/0099515 A1 | 5/2005 | Tsuruoka | |
| 2006/0039039 A1 | 2/2006 | Ooishi | |
| 2006/0232690 A1 * | 10/2006 | Tamura et al. | 348/242 |
| 2007/0183681 A1 * | 8/2007 | Li et al. | 382/261 |
| 2007/0280539 A1 * | 12/2007 | Hasegawa et al. | 382/195 |
| 2008/0043131 A1 * | 2/2008 | Tamura et al. | 348/311 |

FOREIGN PATENT DOCUMENTS

| | | |
|---|---|---|
| JP | 6-086104 A | 3/1994 |
| JP | 2000-023173 A | 1/2000 |
| JP | 2002-503894 A | 2/2002 |
| JP | 2006-060660 A | 3/2006 |
| JP | 2006-245916 A | 9/2006 |

OTHER PUBLICATIONS

Hirakawa, K., Xiao-Li Meng ; Wolfe, P.J."A Framework for wavelet—Based Analysis and Processing of Color Filter Array Images with Applications to Denoising and Demosaicing" ICASSP 2007.*

* cited by examiner

*Primary Examiner* — Li Liu

(74) *Attorney, Agent, or Firm* — Birch, Stewart, Kolasch & Birch, LLP

(57) ABSTRACT

A signal processing apparatus including: a first noise reduction processing section that performs first noise reduction processing on an image, in which each of multitudes of pixels has one of a plurality of color components and the color components are distributed regularly, based only on pixel arrangement to obtain a first processed image; a color component separation section that separates the first processed image into each of the color components to obtain a plurality of color component images; and a signal classification section that compares a signal value of a target pixel for processing with a signal value of each pixel included in a predetermined range of area around the target pixel and classifies each pixel within the predetermined range of area into one of a plurality of groups based on the comparison result.

15 Claims, 13 Drawing Sheets

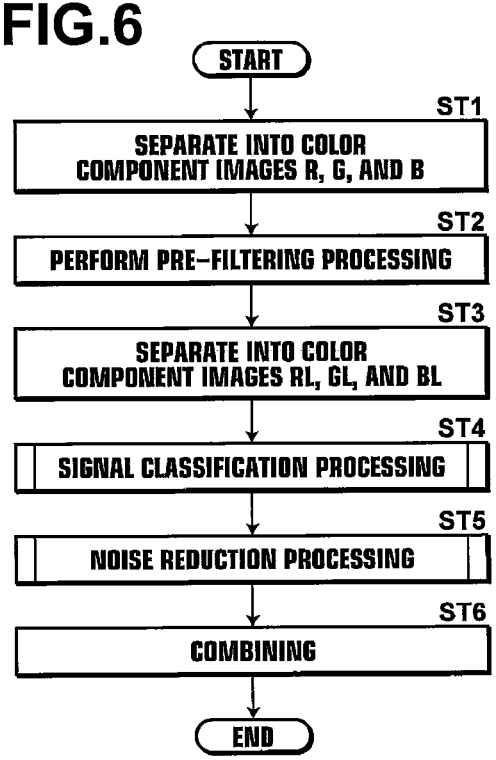

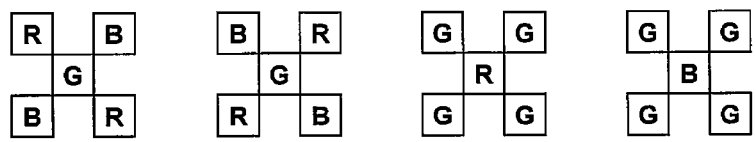
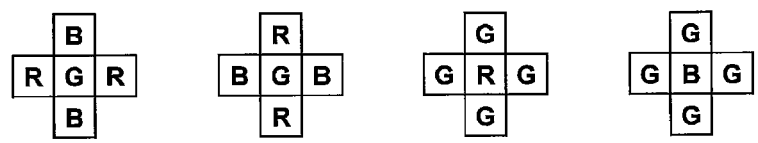
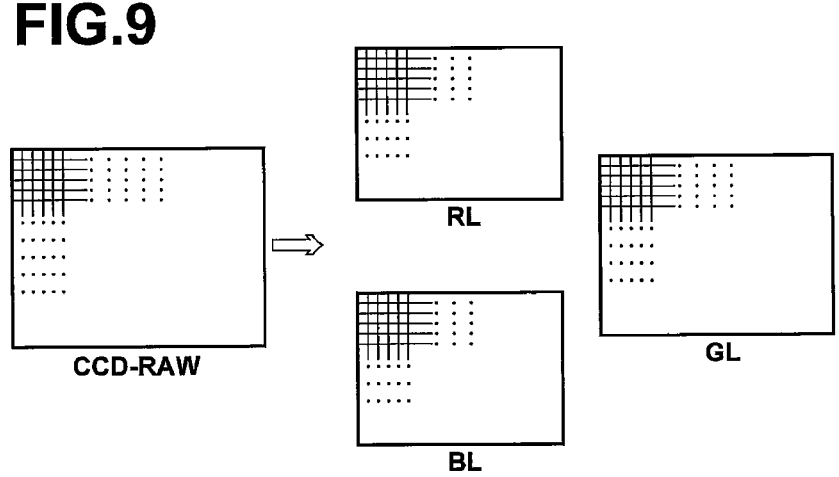

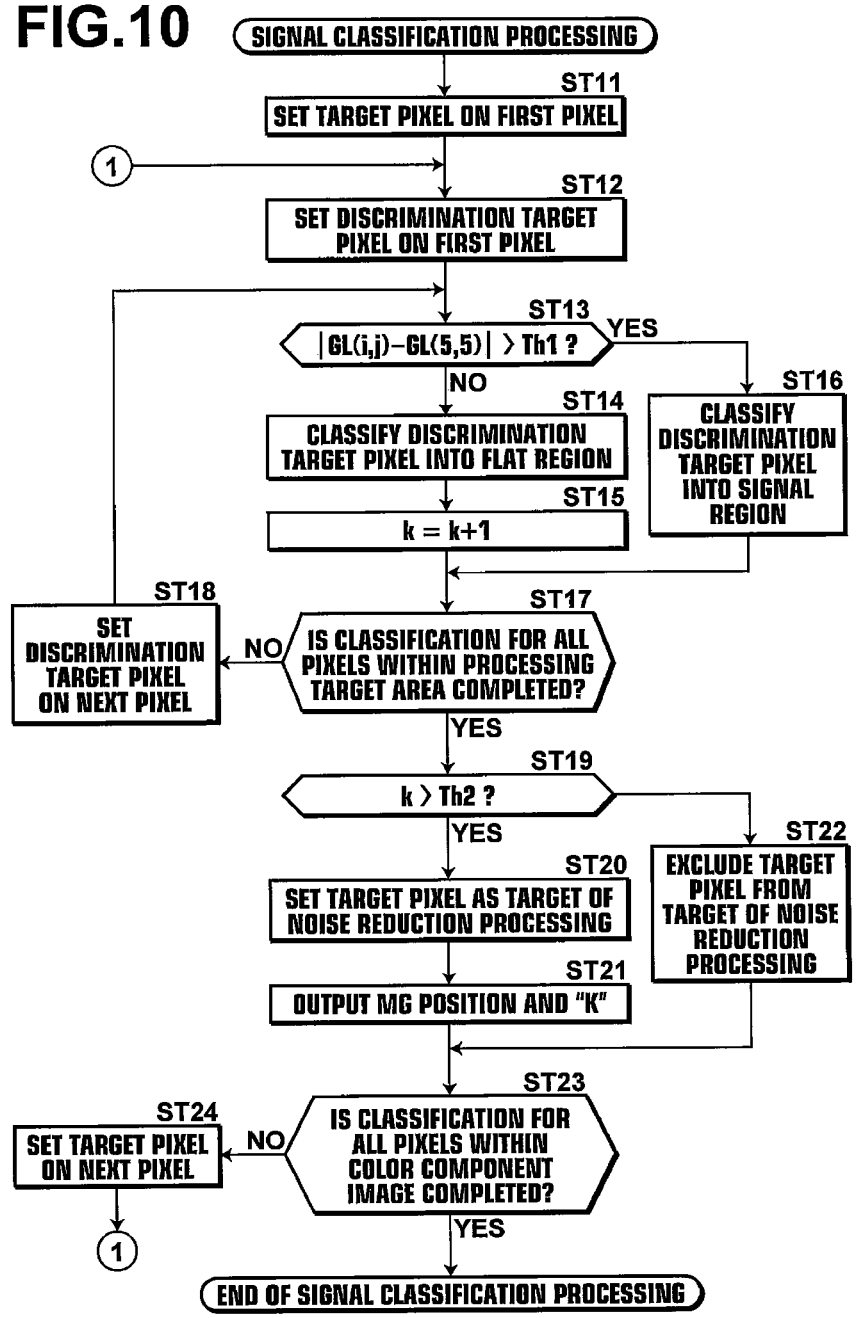

FIG.11A

| GL | GL | GL | GL | GL | GL | GL | GL | GL |
|----|----|----|----|----|----|----|----|----|
| GL | GL | GL | GL | GL | GL | GL | GL | GL |
| GL | GL | GL | GL | GL | GL | GL | GL | GL |
| GL | GL | GL | GL | GL | GL | GL | GL | GL |
| GL | GL | GL | GL | GL | GL | GL | GL | GL |
| GL | GL | GL | GL | GL | GL | GL | GL | GL |
| GL | GL | GL | GL | GL | GL | GL | GL | GL |
| GL | GL | GL | GL | GL | GL | GL | GL | GL |
| GL | GL | GL | GL | GL | GL | GL | GL | GL |

| MG | GL | GL | GL | GL | GL | GL | GL | GL |
|----|----|----|----|----|----|----|----|----|
| MG | MG | MG | MG | GL | GL | GL | GL | GL |
| MG | MG | MG | MG | GL | GL | GL | GL | GL |
| MG | MG | MG | MG | MG | GL | GL | GL | GL |
| MG | MG | MG | MG | MG | MG | GL | GL | GL |
| MG | MG | MG | MG | MG | MG | MG | MG | MG |
| MG | MG | MG | MG | MG | MG | MG | MG | MG |
| MG | MG | MG | MG | MG | MG | MG | MG | MG |
| MG | MG | MG | MG | MG | MG | MG | MG | MG |

―BA

FIG.14
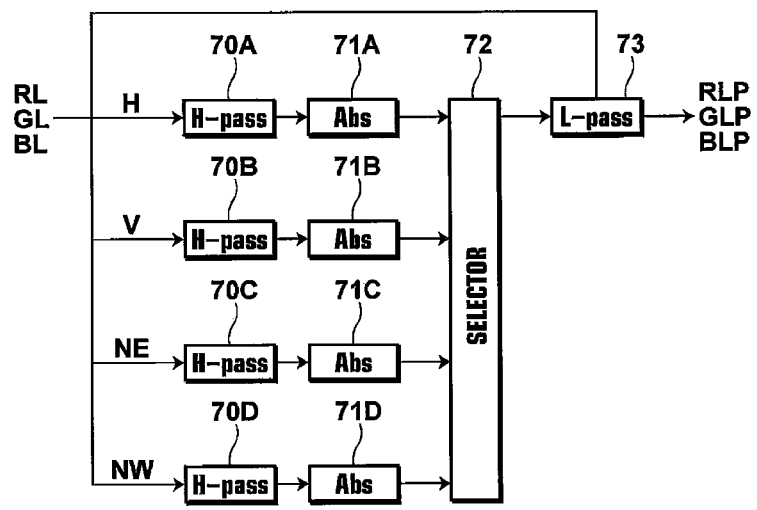
FIG.15A     FIG.15B
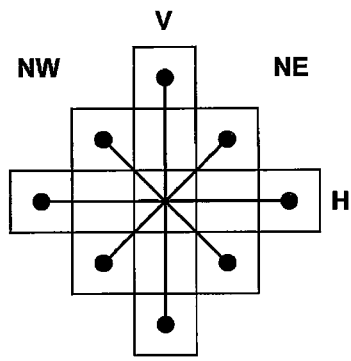     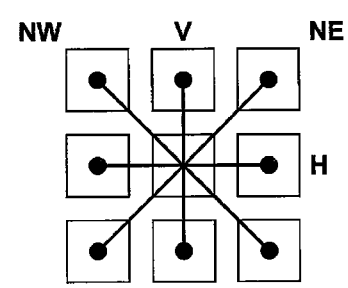

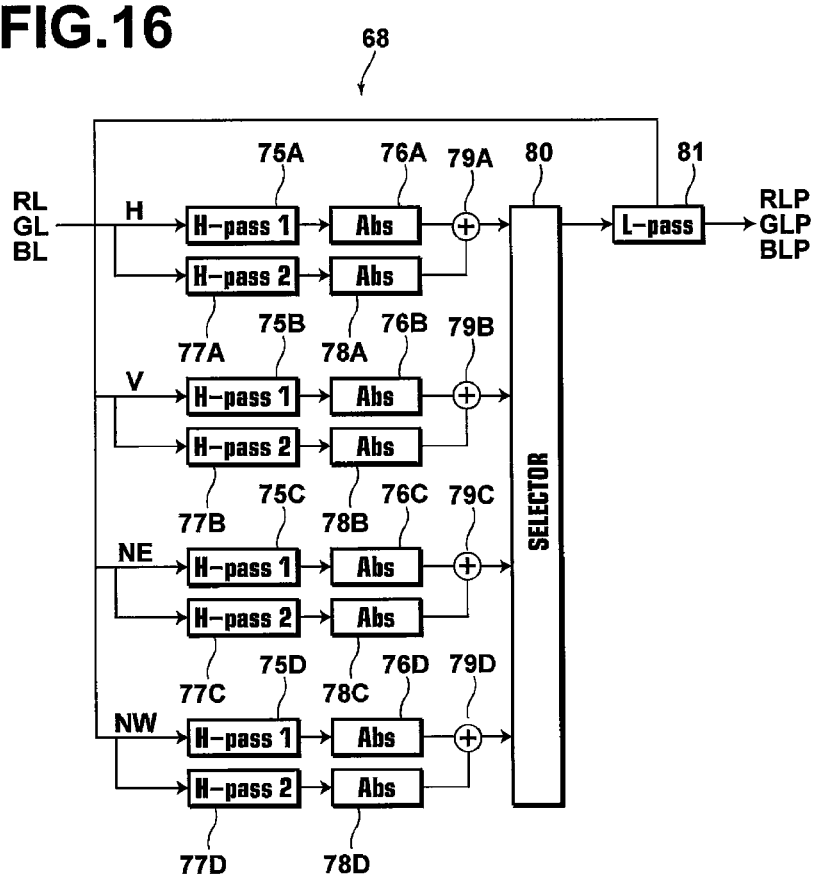

SIGNAL PROCESSING APPARATUS AND METHOD, NOISE REDUCTION APPARATUS AND METHOD, AND PROGRAM THEREFOR

BACKGROUND OF THE INVENTION

1. Field of the Invention

The present invention relates to a signal processing apparatus and method for classifying an image into a plurality of groups according to the magnitude of signal values of the image, a noise reduction apparatus and method for performing noise reduction processing, and a computer program product for causing a computer to perform the signal processing method and noise reduction method.

2. Description of the Related Art

Pixel density and sensitivity of CCD's used in digital cameras and the like are ever increasing. The increase in the sensitivity of CCD's, however, has given rise to a problem of noise included in images obtained by photographing. Consequently, various methods have been proposed for reducing noise included in images. For example, a noise reduction method in which an amount of noise in each pixel of an image is estimated, as well as imaging conditions, then the estimated amount of noise is corrected according to the imaging conditions, and reducing the noise in the image based on the corrected amount of noise is proposed as described, for example, in U.S. Patent Application Publication No. 20050099515. Another method is also proposed as described, for example, in U.S. Patent Application Publication No. 20060039039, in which CCD-RAW data outputted from a CCD are separated into each of R, G, B color components, and noise reduction processing is performed while maintaining the correlation between each color component.

The method described in U.S. Patent Application Publication No. 20050099515 reduces the noise only by smoothing processing, though noise amount is estimated with respect to each pixel, so that the method could not reduce the noise appropriately when the amount of noise is large. In the mean time, the method described in U.S. Patent Application Publication No. 20060039039 could cause an image to be blurred when the photographing sensitivity is increased and hence the noise amounts to a large amount, since in such a case, distinction between the noise and signals of edges and the like is difficult or the correlation between each color component becomes small.

SUMMARY OF THE INVENTION

The present invention has been developed in view of the circumstances described above, and it is an object of the present invention to enable appropriate noise reduction, particularly when a large amount of noise is present.

A signal processing apparatus according to the present invention includes:

a first noise reduction processing means that performs first noise reduction processing on an image, in which each of multitudes of pixels has one of a plurality of color components and the color components are distributed regularly, based only on pixel arrangement to obtain a first processed image;

a color component separation means that separates the first processed image into each of the color components to obtain a plurality of color component images; and a signal classification means that compares a signal value of a target pixel for processing with a signal value of each pixel included in a predetermined range of area around the target pixel and classifies each pixel within the predetermined range of area into one of a plurality of groups based on the comparison result.

Here, the processing target image in the present invention is a CCD-RAW image represented by raw data, so-called CCD-RAW data, outputted from an imaging device, in which each of multitudes of pixels has one of a plurality of color components and the color components are distributed regularly. Thus, the color component of a certain pixel may possibly be different from that of a pixel around the certain pixel. The term "first noise reduction processing based only on pixel arrangement" as used herein means to simply perform noise reduction processing based only on a signal value of a noise reduction target pixel and a signal value of a pixel around the target pixel without regarding the distribution of the color components.

Here, each of the color component images may be classified into a plurality of groups based on the comparison result without performing the first noise reduction processing. However, if a large amount of noise is contained in an image in which each of multitudes of pixels has one of a plurality of color components and the color components are distributed regularly, that is, in a raw image so-called CCD-RAW image outputted from an imaging device, a comparison result between a signal value of a target pixel for processing and a signal value of a pixel included in a predetermined range of area around the target image in each of the color component images is degraded due to the noise, so that each of the color component images can not be accurately classified into a plurality of groups. In particular, a CCD-RAW image obtained by high sensitivity photographing contains a great amount of noise, which makes the classification even more difficult.

In the present invention, the first noise reduction processing is performed on an image, in which each of multitudes of pixels has one of a plurality of color components, and the color components are distributed regularly, i.e., a raw image so-called CCD-RAW image, based only on pixel arrangement. This allows noise in each of the color component images obtained from a CCD-RAW image may be reduced even when a large amount noise is contained in the CCD-RAW image as in high sensitivity photographing. Consequently, each of the color component images may be classified accurately into a plurality of groups according to the comparison result without being affected by the noise.

Further, noise reduction processing may be performed appropriately according to the classified groups, so that a high quality image with reduced noise may be obtained.

Still further, the first noise reduction is performed based only on pixel arrangement, i.e., without regarding the distribution of the color components, so that the first noise reduction processing is performed, in effect, in the frequency band greater than or equal to Nyquist frequency of each of the color components included in an image. Consequently, an image subjected to the noise reduction processing may possibly be blurred slightly, but the blur is reduced in each of the color component images obtained by separating the image into each of the color components. This allows each of the color component images to be classified into a plurality of groups according to the comparison result without being affected by the blur.

In the signal processing apparatus according to the present invention, the signal classification means may be a means that classifies each pixel within the predetermined range of area into a flat region group having a relatively small variance of the signal values or a signal region group having a relatively large variance of the signal values according to the comparison result.

In the signal processing apparatus according to the present invention, the first noise reduction processing may be filtering processing by a low-pass filter on each of the pixels in the image.

Further, the signal processing apparatus according to the present invention may further includes a second noise reduction processing means that performs second noise reduction processing on each of the color component images according to a variance direction of the signal values in each of the pixels in each of the color component images; and the signal classification means may be a means that performs the signal classification processing on each of the color component images subjected to the second noise reduction processing.

As for the "variation direction of the signal values", for example, four directions of horizontal, vertical, upper left to lower right, and lower left to upper right with reference to the target pixel may be used.

In this case, the second noise reduction means may be a means that performs the second noise reduction processing by performing filtering processing on each of the pixels in each of the color component images in a plurality of predetermined directions by a high-pass filter to detect a direction in which the variance of the signal values is smallest based on the filtering result, and performing filtering by a low-pass filter on the direction in which the variance of the signal values is smallest.

This may reduce noise in an image without blurring an edge or the like, since the filtering processing by the low-pass filter is not performed in a direction that crosses the edge or the like where signal values varies.

In this case, the second noise reduction means may be a means that performs the second noise reduction processing by performing filtering processing by a plurality of types of high-pass filters having different frequency characteristics from each other on each of the pixels in each of the color component images in a plurality of predetermined directions to obtain a plurality of filtering results, detecting a direction in which the variance of the signal values is smallest based on the plurality of filtering results, and performing filtering by a low-pass filter on the direction in which the variance of the signal values is smallest.

Here, signal values in an image may vary gradually like gradation, abruptly like an edge, or finely like a pattern on clothing, and frequency characteristics differ in each case. Consequently, by performing filtering processing by a plurality of types of high-pass filters having different frequency characteristics from each other to obtain a plurality of filtering results and detecting a direction in which variance of the signal values is smallest based on the plurality of filtering results, directions in which signal values vary according to various variation modes. Accordingly, the direction in which variance of the signal values is smallest may be detected more adequately, and noise in an image may be reduced more accurately without blurring an edge or the like.

Further, in the signal processing apparatus according to the present invention, the signal classification means may be a means that sets the target pixel as a processing target of noise reduction only when the number of pixels classified into a group having a relatively small signal value within the predetermined range of area around the target pixel exceeds a predetermined threshold value.

As for the "group having a relatively small signal value", a group classified into a flat region may be one of the examples.

A noise reduction apparatus according to the present invention is an apparatus including an image noise reduction means that performs, based on the classification result of the signal classification processing performed by the signal processing apparatus of the present invention, noise reduction processing on each of the color component images.

In the noise reduction apparatus according to the present invention, the noise reduction means may be a means that shifts the level of a signal value of a target pixel for processing such that a mean value of the signal value of the target pixel and a signal value of each pixel included in a predetermined range of area around the target pixel in each of the color component images corresponds to the position of origin of a color space of each of the plurality of color components, performs a calculation of noise reduction on the shifted target pixel according to the level, and restores the level according to the amount of the shift.

Further, in the noise reduction apparatus according to the present invention, the noise reduction means may be a means that estimates the amount of noise in the target pixel, calculates a statistical value representing the amount of noise in the target pixel based on a signal value of the target pixel and a signal value of each pixel included in a predetermined range of area around the target pixel, compares the estimated amount of noise with the statistical value, and determines whether to use the estimated amount of noise or the statistical value in the calculation of noise reduction based on the comparison result.

Still further, in the noise reduction apparatus according to the present invention, the mean value may be a mean value of the signal values of pixels classified into the group having a relatively small signal value within the predetermined range of area.

A signal processing method according to the present invention is a method including the steps of:

performing a first noise reduction processing on an image, in which each of multitudes of pixels has one of a plurality of color components and the color components are distributed regularly, based only on pixel arrangement to obtain a first processed image;

separating the first processed image into each of the color components to obtain a plurality of color component images; and comparing a signal value of a target pixel for processing with a signal value of each pixel included in a predetermined range of area around the target pixel, and classifying each pixel within the predetermined range of area into one of a plurality of groups based on the comparison result.

A noise reduction method according to the present invention is a method including the step of performing noise reduction processing, based on the classification result of the signal classification processing of the signal processing method according to the present invention, on each of the color component images.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and can be in any language including higher level languages, assembly language, and machine language.

BRIEF DESCRIPTION OF THE DRAWINGS

FIG. 2 illustrates a portion of the light receiving surface of a CCD (honeycomb arrangement).

FIG. 3 illustrates a portion of the light receiving surface of a CCD (Beyer arrangement).

FIG. 6 is a flowchart illustrating processing performed in the first embodiment.

FIGS. 7A to 7D illustrate pre-filtering processing on a CCD having an array structure of honeycomb arrangement.

FIGS. 8A to 8D illustrate pre-filtering processing on a CCD having an array structure of Beyer arrangement.

FIG. 9 illustrates separation of color components.

FIG. 10 is a flowchart of signal classifying processing.

FIGS. 11A and 11B illustrate signal classifying processing.

FIG. 14 is a conceptual diagram illustrating processing performed by a gradient discrimination filtering processing section according to the second embodiment.

FIGS. 15A and 15B illustrate high-pass filtering.

FIG. 16 is a conceptual diagram illustrating processing performed by a gradient discrimination filtering section according to a third embodiment.

DESCRIPTION OF THE PREFERRED EMBODIMENTS

Figure 1:
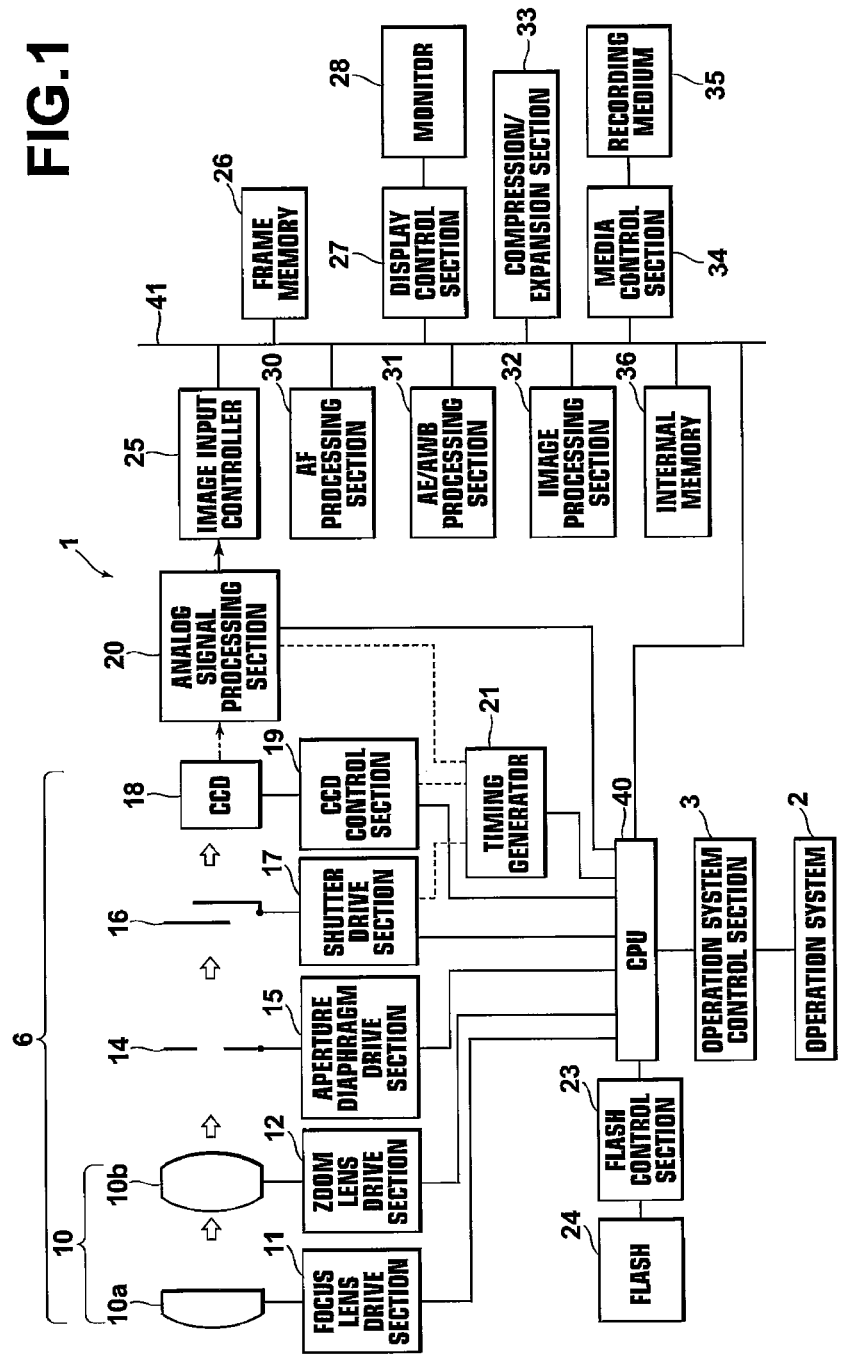
FIG. 1 is a schematic block diagram of a digital camera to which a signal processing apparatus and noise reduction apparatus according to a first embodiment of the present invention is applied, illustrating the construction thereof.

Hereinafter, exemplary embodiments of the present invention will be described with reference to the accompanying drawings. FIG. 1 is a schematic block diagram of a digital camera to which a signal processing apparatus and noise reduction apparatus according to a first embodiment of the present invention is applied, illustrating the construction thereof. As shown in FIG. 1, the digital camera 1 includes an operation system 2 having an operation mode switch, a zoom-lever, an up-down and right-left button, a release button, a power switch, and the like, and an operation system control section 3, which is an interface for transferring operational contents of the operation system 2 to a CUP 40.

An imaging system 6 includes a focus lens 10a and a zoom lens 10b that constitute a taking lens 10. The respective lenses are movable in the optical axis directions by a focus lens drive section 11 and a zoom-lens drive section 12 respectively, each of which including a motor and a motor driver. The focus lens drive section 11 controls movement of the focus lens 10a based on focus drive amount data outputted from an AF processing section 30. The zoom-lens drive section 12 controls movement of the zoom-lens 10b based on data of operated amount of the zoom-lever.

An aperture diaphragm 14 is driven by an aperture diaphragm drive section 15 that includes a motor and a motor driver. The aperture diaphragm drive section 15 controls the aperture diameter of the aperture diaphragm based on aperture value data outputted from an AE/AWB control section 31.

A shutter 16 is a mechanical shutter, and is driven by a shutter drive section 17 which includes a motor and a motor driver. The shutter drive section 17 performs open/close control of the shutter 16 according to a signal generated by the depression of the release button and shutter speed data outputted from the AE/AWE control section 31.

A CCD 18, which is an image sensor, is provided on the rear side of the optical system. The CCD 18 has a photoelectric surface that includes multitudes of light receiving elements disposed two-dimensionally, and the light representing a subject image transmitted through the optical system is focused on the photoelectric surface and subjected to a photoelectric conversion.

Figures 2, 3:
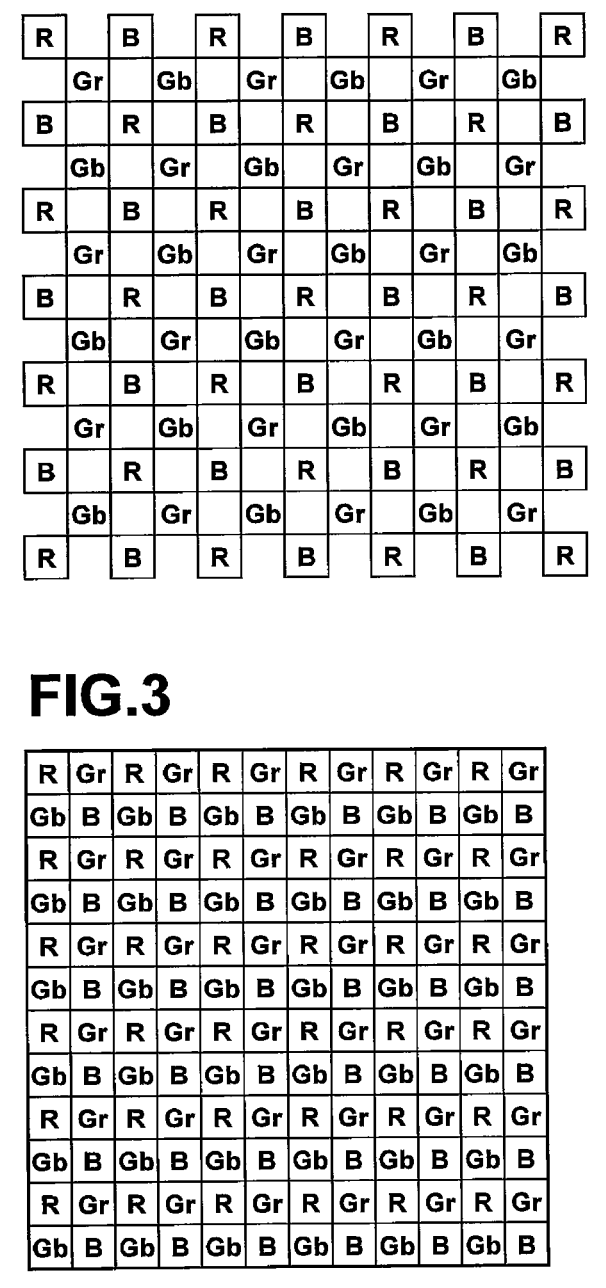

FIG. 2 illustrates a portion of the light receiving surface of the CCD 18. As shown in FIG. 2, the CCD 18 has an array structure of honeycomb arrangement in which light receiving elements are arranged in a checkerboard pattern. For example, 4096 and 1540 light receiving elements are disposed in column and row directions respectively. Thus, if a subject is imaged using this CCD, image data representing a subject image with 4096 and 1540 pixels in the column and row directions respectively are obtained. The signal value obtained from each light receiving element corresponds to the signal value of each pixel of the image.

In addition, a color filter array in which R, G, B filters are arranged regularly is disposed on the light receiving surfaces of multitudes of light receiving elements. As shown in FIG. 2, a color filter having characteristics to pass any one of a red color component (R color component), a blue color component (B color component), and first and second green color components (the first and second green color components may have the same characteristics, G color component) is disposed in the color filter array with respect to each light receiving element. Filters that pass the red color component, blue color component, first green color component, and second green color component are denoted by the alphabets R, B, Gr, and Gb respectively.

Also, as shown in FIG. 2, filters that pass red light component and filters that pass blue light component are formed alternately on the light receiving surfaces of the light receiving elements in the odd number columns. Filters that pass the first green light component and filters that pass the second green light component are formed alternately on the light receiving surfaces of the light receiving elements in the even number columns.

As for the CCD 18, a CCD having an array structure of Beyer arrangement in which pixels are arranged in a square pattern as illustrated in FIG. 3 may also be used, other than a CCD having an array structure of honeycomb arrangement as illustrated in FIG. 2. In the CCD having Beyer arrangement shown in FIG. 3, filters that pass red light component and filters that pass the first green light component are formed alternately on the light receiving surfaces of the light receiving elements in the odd number columns. Filters that pass second green light component and filters that pass the blue light component are formed alternately on the light receiving surfaces of the light receiving elements in the even number columns.

The CCD 18 outputs charges stored in the respective pixels line by line as serial analog image signals in synchronization with a vertical transfer clock signal and a horizontal transfer clock signal supplied from a CCD control section 19. The charge storage time of each pixel, that is, exposure time is determined by an electronic shutter drive signal supplied from the CCD control section 19. The CCD 18 is gain-adjusted by the CCD control section 19 so that an analog image signal having a predetermined level is obtained.

The analog image signals picked up by the CCD 18 are inputted to an analog signal processing section 20. The analog signal processing section 20 includes: a correlated double sampling circuit (CDS) for removing noise from the analog signals; an automatic gain controller (AGC) for controlling the gain of the analog signals; and an A/D converter (ADC) for converting the analog signals to digital signals. Hereinafter, processing performed by the analog signal processing section 20 is referred to as the "analog signal processing". The image data converted to digital signals are CCD-RAW data in which each pixel has RGB density values. That is, in the CCD-RAW data, data having color components according to the color filters formed on the light receiving surfaces of the light receiving elements serially appear line-by-line. Each pixel of a CCD-RAW image represented by the CCD-RAW data is represented by any one of the red color component, blue color component, first green color component, and second green color component, and does not have signal values of the other color components. The signal values of the other color components are interpolated by color interpolation to be described later.

A timing generator 21 is a generator that generates timing signals, which are inputted to the shutter drive section 17, CCD control section 19, and analog signal processing section 20, thereby the operation of the release button, open/close of the shutter 16, charge acquisition of the CCD 18, and the processing of the analog signal processing section 20 are synchronized.

A flash control section 23 causes a flash 24 to emit light at the time of photographing.

An image input controller 25 writes the CCD-RAW data, inputted from the analog signal processing section 20, into a frame memory 26.

The frame memory 26 is a work memory used when various types of image processing (signal processing), to be described later, are performed on the image data, and constituted, for example, by a SDRAM (Synchronous Dynamic Random Access Memory) that performs data transfer in synchronization with a bus clock signal having a constant frequency.

A display control section 27 is a control section for causing a liquid crystal monitor 28 to display the image data stored in the frame memory 26 as through images, or to display image data stored in the recording medium 35 when in playback mode.

The AF processing section 30 and AE/AWB processing section 31 determine an imaging condition based on a pre-image. The pre-image is an image based on the image data stored in the frame memory 26 as a result of pre-imaging performed by the CCD 18, which is caused by the CPU 40 that has detected a halfway depression signal generated when the release button is depressed halfway.

The AF processing section 30 detects a focus position based on the pre-image, and outputs focus drive amount data (AF processing). As for the focus position detection method, for example, a passive method that makes use of the fact that when a desired subject is focused, the contrast becomes high.

The AE/AWB processing section 31 measures subject brightness based on the pre-image, determines ISO sensitivity, aperture value, shutter speed, and the like, and determines the ISO sensitivity data, aperture value data, and shutter speed data as an exposure setting value (AE control), as well as automatically adjusting the white balance at the time of photographing (AWB control).

Figure 4:
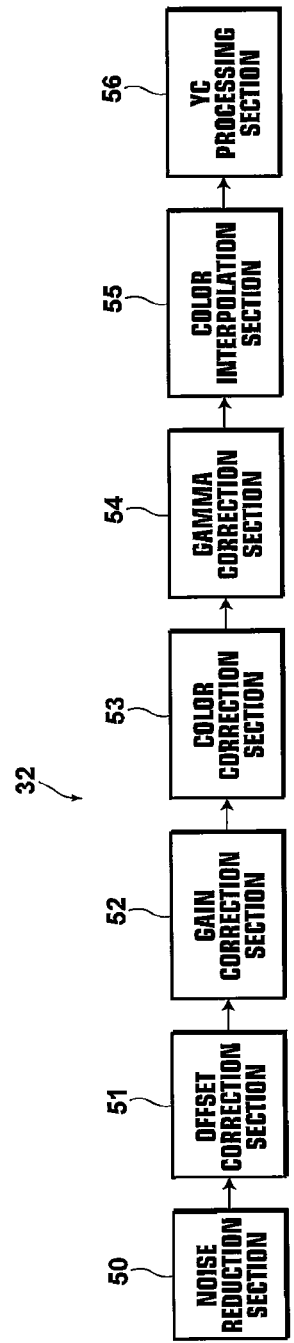
FIG. 4 is a block diagram illustrating an electrical configuration of the image processing section.

FIG. 4 is a block diagram of the image processing section 32 illustrating the electrical configuration thereof. As shown in FIG. 4, the image processing section 32 performs, on the CCD-RAW data of a final image, noise reduction, offset correction, gain correction, color correction, gamma correction, and color interpolation for interpolating each color component of the CCD-RAW data in a noise reduction section 50, an offset correction section 51, a gain correction section 52, a color correction section 53, a gamma correction section 54, and a color interpolation section 55 respectively. Then, it performs, in a YC processing section 56, YC processing in which the CCD-RAW data interpolated in the color component are converted to YC data constituted by Y data (luminance signal data), Cb data (blue color difference signal data), and Cr data (red color difference signal data).

The features of the first embodiment are in the processing performed in the noise reduction section 50, but will be described later.

The term "final image" as used herein means an image based on image data picked up by the CCD 18 through a main photographing performed when the release button is fully depressed and stored in the frame memory 16 via the analog signal processing section 20 and the image input controller 25.

A compression/expansion section 33 generates an image file, by performing, for example, JPEG format compression on the CCD-RWA data of the final image processed by the image processing section 32. A tag that includes auxiliary information, such as the date and time of photographing, and the like stored based on, for example, Exit format or the like, is attached to the image file. Further, the compression/expansion section 33 reads out a compressed image file from the recording medium 35 and performs expansion thereon when in playback mode. The expanded image data are outputted to the monitor 28 and an image represented by the image data is displayed.

The media control section 34 gains access to the recording medium 35 to control read/write operations of image files.

An internal memory 36 stores various constants to be set within the digital camera 1, a program to be performed by the CPU 40, and the like.

The CPU 40 controls each section of the main body of the digital camera 1 in response to the signals from various sections, including the operation system 2, AF control section 30, and the like.

Various processing sections, frame memory 26, CPU 40, and the like are connected to a data bus 41, and digital image data, various instructions, and the like are exchanged through the bus 41.

The digital camera 1 according to the first embodiment is constructed in the manner as described above, and CCD-RAW data obtained by the CCD 18 by photographing are processed by the image processing section 32, then the processed image data are compressed by the compression/expansion section 33, and the compressed image data are recorded on the recording medium 35 by the media control section 34.

Figure 5:
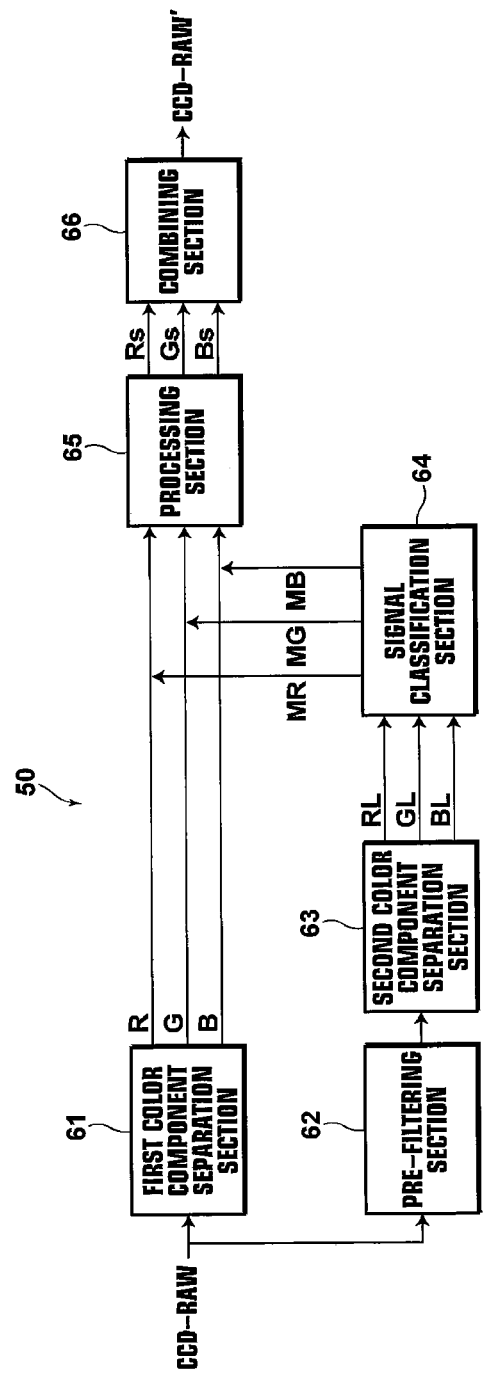
FIG. 5 is a schematic block diagram of a noise reduction section in the first embodiment.

Noise reduction processing performed in the first embodiment will now be described in detail. FIG. 5 is a schematic block diagram of the noise reduction section 50 in the first embodiment. Here, it is noted that green color component of CCD-RAW data is constituted by the first and second color components, Gr and Gb, but in the following description the color components, Gr and Gb will be treated as the same color component. As shown in FIG. 5, the noise reduction section 50 includes: a first color component separation section 61 that separates inputted CCD-RAW data (R, G, B) into each of RGB color components to obtain color component images R, G, and B; a pre-filtering section 62 (a first noise reduction processing means) that performs pre-filtering processing(a first noise reduction processing) on the CCD-RAW data (R, G, B); a second color component separation section 63 that separates the pre-filtered CCD-RAW data into each of RGB color components to obtain color component images RL, GL, and BL; a signal classification section 64 that performs signal classifying processing, as will be described later, on the color component images RL, GL, and BL; a processing section 65 (an image noise reduction means) that performs noise reduction processing on the color component images R, G, and B based on the classifying result performed by the signal classification section 64 to obtain noise reduction processed color component images Rs, Gs, and Bs; and a combining section 66 that generates noise reduction processed CCD-RAW data (CCD-RAW') from the color component images Rs, Gs, and Bs.

Hereinafter, functions of the first color component separation section 61, pre-filtering section 62, second color component separation section 63; signal classification section 64; and processing section 65 will be described based on the flowchart shown in FIG. 6. As described above, when a final photographing is performed and CCD-RAW data (R, G, B) are inputted to the noise reduction processing section 50 of the image processing section 32, the processing is initiated. First, the first color component separation section 61 separates the CCD-RAW data into each of RGB color components to obtain color component images R, G, and B (step ST1). In the mean time, the pre-filtering section 62 performs pre-filtering processing on the CCD-RAW data (R, G, B) (step ST2).

The pre-filtering processing is filtering processing on a processing target pixel and pixels around the target pixel using a low-pass filter based only on the pixel arrangement of the CCD-RAW data (R, G, B) without regarding color distribution of each pixel. Here, as for the low-pass filter, for example, a low-pass filter that performs an average calculation or a weighted average calculation of the processing target pixel and four pixels around the target pixel may be employed.

In a case where the CCD 18 has the array structure of honeycomb arrangement shown in FIG. 2, and the color component of the target pixel is G, the pre-filtering processing is filtering processing using signal values of B color component pixels and signal values of R color component pixels located at the upper right, lower right, lower left, and upper left of the target pixel, as illustrated in FIGS. 7A and 7B. If the color component of the target pixel is R or B, then the pre-filtering processing is filtering processing using signal values of G color component pixels located at the upper right, lower right, lower left, and upper left of the target pixel, as illustrated in FIGS. 7C and 7D.

In the mean time, in a case where the CCD 18 has the array structure of Beyer arrangement shown in FIG. 3, and the color component of the target pixel is G, the pre-filtering processing is filtering processing using signal values of B color component pixels and signal values of R color component pixels located at the upper, lower, left, and right of the target pixel, as illustrated in FIGS. 8A and 8B. If the color component of the target pixel is R or B, then the pre-filtering processing is filtering processing using signal values of G color component pixels located at the upper, lower, left, and right of the target pixel, as illustrated in FIGS. 8C and 8D.

Pre-filtering processing when the CCD 18 has the honeycomb arrangement is shown in formulae (1) to (3) and pre-filtering processing when the CCD 18 has the Beyer arrangement is shown in formulae (4) to (6) below. In formulae (1) to (6), the suffix (0, 0) denotes the coordinates of the target pixel, and the suffix (i, j) (i, j=−1 to 1, i indicates horizontal directions, and j indicates vertical directions) denotes the coordinates of a pixel around the target pixel. In addition, "a" is the filter coefficient of the low-pass filter. Further, formula (2) corresponds to the processing of FIG. 7B, and formula (5) corresponds to the processing of FIG. 8B.

$$RL_{0,0}=(a_{-1,-1}*G_{-1,-1}+a_{-1,1}*G_{-1,1}+a_{1,-1}*G_{1,-1}+a_{1,1}*G_{1,1}+a_{0,0}*R_{0,0})/(a_{-1,-1}+a_{-1,1}+a_{1,-1}+a_{1,1}+a_{0,0}) \quad (1)$$

$$GL_{0,0}=(a_{-1,-1}*R_{-1,-1}+a_{-1,1}*B_{-1,1}+a_{1,-1}*B_{1,-1}+a_{1,1}*R_{1,1}+a_{0,0}*G_{0,0})/(a_{-1,-1}+a_{-1,1}+a_{1,-1}+a_{1,1}+a_{0,0}) \quad (2)$$

$$BL_{0,0}=(a_{-1,-1}*G_{-1,-1}+a_{-1,1}*G_{-1,1}+a_{1,-1}*G_{1,-1}+a_{1,1}*G_{1,1}+a_{0,0}*B_{0,0})/(a_{-1,-1}+a_{-1,1}+a_{1,-1}+a_{1,1}+a_{0,0}) \quad (3)$$

$$RL_{0,0}=(a_{-1,0}*G_{-1,0}+a_{0,-1}*G_{0,-1}+a_{1,0}*G_{1,0}+a_{0,1}*G_{0,1}+a_{0,0}*R_{0,0})/(a_{-1,0}+a_{0,-1}+a_{1,0}+a_{0,1}+a_{0,0}) \quad (4)$$

$$GL_{0,0}=(a_{-1,0}*B_{-1,0}+a_{0,-1}*R_{0,-1}+a_{1,0}*B_{1,0}+a_{0,1}*R_{0,1}+a_{0,0}*G_{0,0})/(a_{-1,0}+a_{0,-1}+a_{1,0}+a_{0,1}+a_{0,0}) \quad (5)$$

$$BL_{0,0}=(a_{-1,0}*G_{-1,0}+a_{0,-1}*G_{0,-1}+a_{1,0}*G_{1,0}+a_{0,1}*G_{0,1}+a_{0,0}*B_{0,0})/(a_{-1,0}+a_{0,-1}+a_{1,0}+a_{0,1}+a_{0,0}) \quad (6)$$

By performing the pre-filtering in the manner as described above, random noise in the CCD-RAW data may be removed to a certain extent.

In the present embodiment, pre-filtering processing is performed on the CCD-RAW data prior to color interpolation processing, because noise in the CCD-RAW data in this stage maintains spatial randomness. That is, after color interpolation processing, the randomness of noise in each color component image is lost, so that noise can not be reduced by pre-filtering processing in this case. Therefore, in the present embodiment, pre-filtering processing is performed before color interpolation processing.

Next, the second color component separation section 63 separates the CCD-RAW data (RL, GL, BL) into color component images RL, GL, and BL of R, G, B color components respectively (step ST3).

FIG. 9 illustrates separation of the color components. In the present embodiment, CCD-RAW data (RL, GL, BL) are separated such that the pixel arrangement of an image represented by the CCD-RAW data represents an image constituted only by each of RGB color components, thereby color component images RL, GL and BL are obtained.

Then, signal classifying processing is performed by the signal classification section 64. In the signal classifying processing, a noise reduction processing target area BA of 9×9 pixels (81 pixels) in the column directions and row directions respectively is set in each of color component images RL, GL, and BL. Then, all of the pixels within the processing target area BA are classified into a flat region where the variation of signal values is small and a signal region where the variation of signal value is large based on the signal value of each pixel within the processing target area BA. It is noted that the size of the processing target area BA is not limited to the 81 pixels.

FIG. 10 is a flowchart of the signal classifying processing. Signal classifying processing performed on each of the color component images PL, GL, and BL is identical, so that only the signal classifying processing performed on the green color component image GL will be described here. The target pixel for signal classifying processing is set on a first pixel (step ST11), and one pixel (discrimination target pixel) (i,j) is set on a first pixel within the processing target area BA of 9×9 pixels centered on the target pixel (step ST12), and a determination is made as to whether or not the absolute difference |GL(i,j)−GL(5,5)| between the signal value GL(i,j) of the discrimination target pixel (i,j) and the signal value GL(5,5) of the target pixel (5,5) located in the center of the processing target area BA exceeds a predetermined threshold value Th1 (step ST13). The coordinates of the processing target area BA are set such that the upper left corner thereof corresponds to (1,1). Here, the ratio between the signal value GL(i,j) and signal value GL(5,5) may be used in place of the absolute difference |GL(i,j)−GL(5,5)|.

If step ST13 is negative, the discrimination target pixel (i,j) is classified into a flat region group having a relatively sam11 variation of signal values, since the discrimination target pixel(i,j) is considered to have a correlation with the target pixel (5,5) (step ST14), and the number "k" of the pixels classified into the flat region group is incremented by 1 (step ST15). The initial value of "k" is set to 1 since the target pixel (5, 5) serves as the reference.

On the other hand, if step ST13 is positive, the discrimination target pixel (i,j) is classified into a signal region group having a large signal value difference from the target pixel (5, 5), instead of the flat region group, since the discrimination target pixel (i,j) is considered not to have a correlation with the target pixel(5,5) (step ST16).

Following step ST15 or step ST16, a determination is made as to whether or not the classifying is completed for all of the pixels within the processing target area BA (step ST17). If step ST17 is negative, the discrimination target pixel is set on the next pixel (step ST18), and the processing returns to step ST13 to repeat the processing from step ST13 onward.

This results in that the processing target area BA of 9×9=81 pixels shown in FIG. 11A to be classified into the flat region enclosed by a bold line with reference to the central target pixel (shown by hatched lines) and the signal region as illustrated in FIG. 11B. The number of pixels in the flat region shown in FIG. 11B is 56. It is noted that each of the pixels classified into the flat region is denoted by a reference symbol MG in the color component images RL, GL, and BL and in the color component images R, G, and B, in order to indicate that the pixel belongs to the flat region. Further, in the color component images RL and BL, each pixel classified in to the flat region is denoted by reference symbols MR and MB respectively. Still further, in some instances, the reference symbol MR, MG, or MB is used for the signal value of each pixel classified into the flat region.

Then, if step ST17 is positive, a determination is made whether or not the number "k" of the pixels MG classified into the flat region group within the processing target area BA exceeds a predetermined threshold value Th2 (step ST19). If step ST17 is positive, the target pixels are set as the target of noise reduction processing in the subsequent stage (step ST20), and positions of the flat region pixels MG within the processing target area BA and "k" are outputted (step ST21). In the mean time, if step ST19 is negative, the target pixels are excluded from the target of noise reduction processing (step ST22).

Here, if the variation in the signal values is small within a processing target area BA around a target pixel, the value "k" will become relatively large and will exceed the threshold value Th2, which means that the target pixels are highly likely to be located in the flat region where noise is quite visible, so that they are set as the target of noise reduction processing. In contrast, if an edge or a fine pattern is present within a processing target area BA around a target pixel, the variation in the signal values will become great. Consequently the value "k" will become relatively small and will not exceed the threshold value Th2. In such a case, the target pixels are excluded from the target of noise reduction processing, since noise reduction processing on such pixels causes the edge or fine pattern to be blurred.

Following step ST21 or ST22, a determination is made as to whether or not the classifying is completed for all of the pixels of the color component image GL (step ST23). If step ST23 is negative, the target pixel is set on the next pixel (step ST24), and the processing returns to step ST12 to repeat the processing from step ST12 onward.

Figure 12:
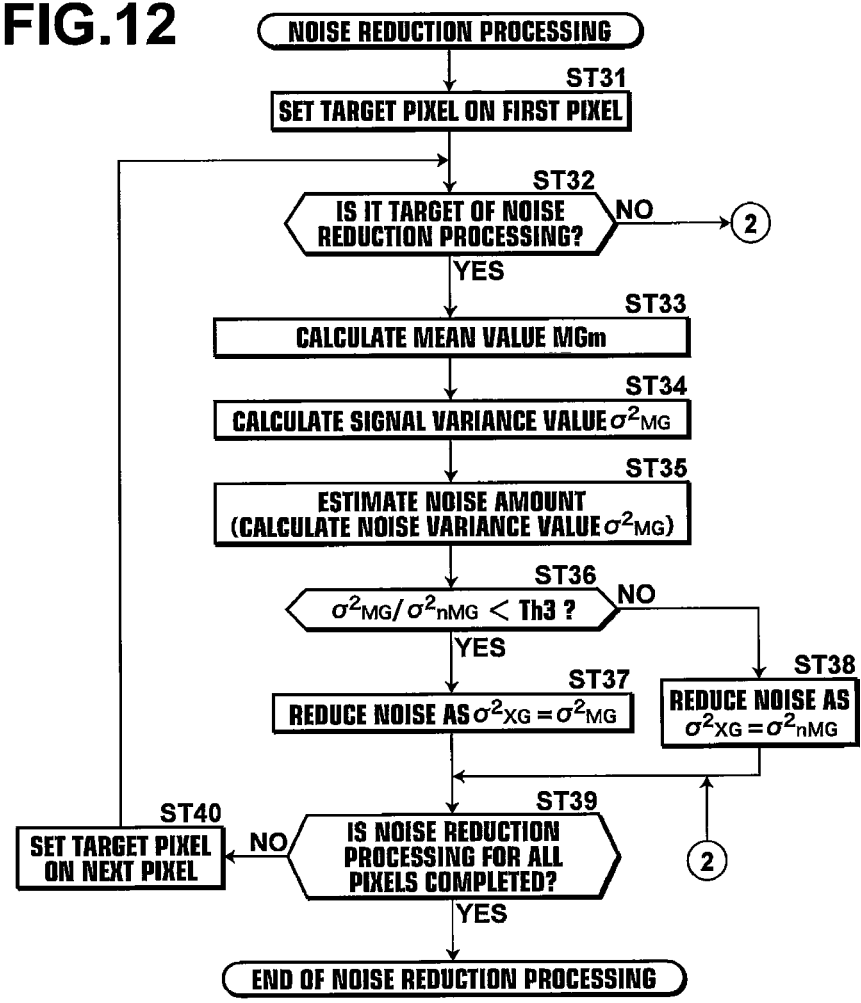
FIG. 12 is a flowchart of noise reduction processing.

Returning to FIG. 6, following the signal classifying processing, the processing section 65 performs noise reduction processing on the color component images R, G, and B (step ST5). FIG. 12 is a flowchart of the noise reduction processing. Noise reduction processing performed on each of the color component images R, G, and B is identical, so that only the signal classifying processing performed on the green color component image C will be described here. The target pixel for noise reduction processing is set on a first pixel (step ST31), and a determination is made as to whether or not the target pixel is set as a target of noise reduction processing by the signal classifying processing described above (step ST32). If step ST32 is negative, the processing proceeds to step ST39 to be described later.

If step ST32 is positive, a mean value MGm of signal values of pixels MG classified into the flat region within a processing target area BA having the same size as that of the signal classifying processing is calculated by formulae (7) and (8) shown below (step ST33). In addition, a variance value (statistical value representing noise) $\sigma^2_{MG}$ representing a noise amount based on the signal value within the processing target area BA is calculated (step ST34).

$$MGm = \frac{1}{\sum\sum wij} \sum\sum wij \cdot MG(i, j) \quad (7)$$

$$\sigma^2_{MG} = \frac{1}{k-1} \sum\sum (MG(i, j) - MGm) \quad (8)$$

In formula (7), wij is the weighting factor for the signal value MG(i,j). In formulae (7) and (8), Σ indicates that "k" signal values MG(i,j) are all added up. Further, formulae (7) and (8) calculate the mean value and variance value of the color component image G, and not of the color component image GL.

In the mean time, the processing section 65 estimates the noise amount within the processing target area BA using the mean value MGm calculated in step ST33 (step ST35). More specifically, the processing section 65 calculates the noise variance value $\sigma^2_{nMG}$ representing the estimated amount of noise, as indicated in formula (9) below. In formula (9), A, B, and C are coefficients determined by the dark noise, optical shot noise and fixed pattern noise which are inherent to the CCD 18. The term "offset" in formula (9) means the offset value of the CCD 18. It is noted that the variance value $\sigma^2_{MG}$ calculated by formula (8) is hereinafter referred to as "signal variance value" in order to distinguish from the noise variance value $\sigma^2_{nMG}$ calculated by formula (9).

$$\sigma^2_{nMG} = A \cdot (MGm - \text{offset})^2 + B \cdot (MGm - \text{offset}) + C \quad (9)$$

Then, the processing section 65 determines whether or not the ratio of the noise variance value $\sigma^2_{nMG}$ to the signal variance value $\sigma^2_{MG}$, $\sigma^2_{MG}/\sigma^2_{nMG}$ is smaller than a predetermined threshold value Th3 (step ST36). Here, if the signal classifying processing described above is performed appropriately, the signal variance value $\sigma^2_{MG}$ is substantially equal to the noise variance value $\sigma^2_{nMG}$, thus the ratio of $\sigma^2_{MG}/\sigma^2_{nMG}$ takes a value close to 1. In the mean time, the signal classifying processing uses color component images RL, GL, and BL reduced in noise to a certain extent by the pre-filtering processing. Consequently, even when a target pixel is classified into the flat region, an edge or a fine pattern is possibly included in the color component images R, G, and B not subjected to the pre-filtering processing. In such a case, the signal variance value $\sigma^2_{MG}$ becomes greater than the noise variance value $\sigma^2_{nMG}$, thus the ratio of $\sigma^2_{MG}/\sigma^2_{nMG}$ becomes great.

If step ST36 is positive, it can be regarded that the target pixel is located in the flat region, so that noise in the target pixel is reduced by substituting the signal variance value $\sigma^2_{MG}$ to $\sigma^2_{XG}$ in formula (10) below (ST37). In the mean time, if step ST36 is negative, it is highly likely that the target pixel is located in the signal region, so that noise in the target pixel is reduced by substituting the noise variance value $\sigma^2_{nMG}$ to $\sigma^2_{XG}$ in formula (10) below (step ST38). In formula (10), $\alpha$ is the coefficient for determining noise reduction level, the value of which is from 0 to 1.

$$Gs = MGm + \left(\frac{\sigma^2_{MG} - \alpha \cdot \sigma^2_{XG}}{\sigma^2_{MG}}\right) \cdot (G - MGm) \quad (10)$$

In formula (10), by subtracting the mean value MGm from the pixel value G of the target pixel, the signal value of the pixel within the processing target area BA is shifted to the position of origin of the color space having G color component in the coordinate system, and the shifted target pixel is multiplied by $(\sigma^2_{MG} - \alpha \cdot \sigma^2_{XG})/\sigma^2_{MG}$. Then, by adding the mean value MGm after the multiplication, the signal value of the target pixel is restored to a level corresponding to the original signal value. Here, $(\sigma^2_{MG} - \alpha \cdot \sigma^2_{XG})/\sigma^2_{MG}$ takes a value in the range from 0 to 1, so that the pixel value Gs of the processed target pixel takes a value in the range from the pixel value G prior to the processing and the mean value MGm.

Accordingly, for example, if $\alpha=1$ and the ratio of $\sigma^2_{MG}/\sigma^2_{nMG}$ is smaller than the predetermined threshold value Th3, then $\sigma^2_{XG}$=signal variance value $\sigma^2_{MG}$, thus $(\sigma^2_{MG} - \alpha \cdot \sigma^2_{XG})/\sigma^2_{MG}$ becomes 0 and the signal value Gs of the processed target pixel becomes equal to the mean value MGm. If the ratio of $\sigma^2_{MG}/\sigma^2_{nMG}$ is greater than or equal to the predetermined threshold value Th3, then $\sigma^2_{XG}$=noise variance value $\sigma^2_{nMG}$, thus $\sigma^2_{MG} \gg \sigma^2_{nMG}$ and $(\sigma^2_{MG} - \alpha \cdot \sigma^2_{XG})/\sigma^2_{MG}$ takes a value which is closer to 1, so that the signal value Gs of the processed target pixel takes a value which is closer to the signal value prior to the processing.

Then, a determination is made as to whether or not the noise reduction processing is completed for all of the pixels (step ST39). If step ST39 is negative, the target pixel is set on the next pixel (step ST40), and the processing returns to step ST32 to repeat the processing from step ST32 onward. If step ST39 is positive, the noise reduction processing is terminated.

Returning to FIG. 6, the combining section 66 combines the processed color component images Rs, Gs, and Bs to generate processed CCD-RAW data (CCD-RAW'), thereby the noise reduction processing is completed. The noise-reduction processed CCD-RAW data are subjected to the offset correction, color correction, gamma correction, and color interpolation for interpolating each color component of the CCD-RAW data in the offset correction section 51, gain correction section 52, color correction section 53, gamma correction section 54, and color interpolation section 55 respectively. Then, in the YC processing section 56, the CCD-RAW data interpolated in the color component are converted to YC data constituted by Y data which are luminance signal data, Cb data which are blue color difference signal data, and Cr data which are red color difference signal data.

Thereafter, the compression/expansion processing section 33 performs compression on the CCD-RAW data processed by the image processing section 32 in JPEG compression format or the like to generate an image file. The generated image file is recorded on the recording medium 35 by the media control section 34.

In this way, in the first embodiment, pre-filtering processing is performed on CCD-RAW data (R, G, B) to reduce noise to a certain extent when performing signal separation processing. Here, it is also possible to classify the pixels within the processing target area BA into the flat region and the signal region without performing pre-filtering processing. However, if a large amount of noise is contained in a CCD-RAW image represented by the CCD-RAW data, a comparison result between the signal value of a processing target pixel and the signal value of each pixel within a processing target area in each of the color component images R, G, and B does not show any appreciable difference due to the noise, so that the pixels within the processing target area can not be accurately classified into the flat region and signal region. In particular, a CCD-RAW image obtained by high sensitivity photographing contains a great amount of noise, which makes the classifying of pixels into the flat region and signal region even more difficult.

In the first embodiment, pre-filtering processing is performed on CCD-RAW data, so that even if a large amount of noise is contained in the CCD-RAW data, like those obtained by high sensitivity photographing, noise contained in color component images R, G, and B obtained from the CCD-RAW data may be reduced. Accordingly, pixels within a processing target area BA may be accurately classified into the flat region and signal region.

Further, the pre-filtering processing is performed on CCD-RAW data based only on the pixel arrangement, i.e., without regarding color distribution of each pixel, so that noise is reduced, in effect, in the frequency band greater than or equal to Nyquist frequency of each of the color components included in an image. Consequently, the pre-filtered image is slightly blurred, but the blur is reduced in the color component images RL, GL, and BL obtained by separating the image into each of the color components. This allows pixels within a processing target area BA to be classified into the flat region and signal region according to the comparison result without being affected by the blur.

In the mean time, signal variation does not occur or is very small in the flat region of an image, and if a target pixel is classified into the flat region, the signal variance value $\sigma^2_{MG}$ represents the variance of noise, so that, ideally, the signal variance value $\sigma^2_{MG}$ corresponds to the noise variance value $\sigma^2_{nMG}$. However, the $\sigma^2_{nMG}$ is an estimated value of noise amount calculated by formula (9) above, whereas the signal variance value $\sigma^2_{MG}$ is a variance value calculated for a certain limited area on an image based on actual signal values. Therefore, there may be a case where a portion where the signal variance value $\sigma^2_{MG}$ and noise variance value $\sigma^2_{nMG}$ do not correspond to each other is developed on an image. In such a case, if noise reduction processing is performed based on the calculation of formula (10) using only the noise variance value $\sigma^2_{nMG}$, spots may possibly may possibly be developed in the flat region of the image due to the portion where the signal variance value $\sigma^2_{MG}$ and noise variance value $\sigma^2_{nMG}$ do not correspond to each other.

In the mean time, the signal classifying processing described above uses color component images RL, GL, and BL reduced in noise to a certain extent by the pre-filtering processing. Consequently, even when a target pixel is classified into the flat region, an edge or a fine pattern is possibly included in the color component images R, G, and B not subjected to the pre-filtering processing. In such a case, the signal variance value $\sigma^2_{MG}$ becomes great, so that if a calculation of formula (10) is made using only the signal variance value $\sigma^2_{MG}$, the edge or fine pattern may possibly be blurred.

Here, if the signal variance value $\sigma^2_{MG}$ substantially corresponds to the noise variance value $\sigma^2_{nMG}$, i.e., if the estimated noise amount substantially corresponds to measured noise amount, the ratio of $\sigma^2_{MG}/\sigma^2_{nMG}$ takes a value close to 1. In this case, in the first embodiment, the target pixel is assumed to be located in the flat region, and the calculation of formula (10) is made using the measured noise amount, i.e., signal variance value $\sigma^2_{MG}$, so that noise in the flat region may be reduced appropriately without developing spots. In the mean time, if noise is overly reduced by the pre-filtering processing, the signal variance value $\sigma^2_{MG}$ becomes greater than the noise variance value $\sigma^2_{nMG}$, so that the ratio of $\sigma^2_{MG}/\sigma^2_{nMG}$ becomes large. In this case, the ratio between the signal variance value $\sigma^2_{MG}$ and noise variance value $\sigma^2_{nMG}$, $\sigma^2_{MG}/\sigma^2_{nMG}$ is greater than or equal to the threshold value Th3, and the target pixel is assumed to be located in the signal region, substitution of $\sigma^2_{nMG}$ to the $\sigma^2_{XG}$ in formula (10) may prevent an edge or a fine pattern to be blurred. Accordingly, noise may be reduced without causing the edge or fine pattern to be blurred or spots to be developed in the flat region.

Further, in the signal classifying processing, pixels classified into the signal region are excluded from the target of noise reduction processing, so that noise may be reduced without causing an edge or a fine pattern to be blurred.

In the first embodiment, a determination is made as to whether or not the absolute difference |GL(i,j)−GL(5,5)| between the signal value GL(i,j) of the discrimination target pixel (i,j) and the signal value GL(5,5) of the central target pixel (5,5) exceeds a predetermined region discrimination threshold value Th1. But, for example, an alternative method may be used in which two threshold values Th1 and Th1' (Th1>Th1'), and a determination is made as to whether the absolute difference |GL(i,j)−GL(5,5)| is smaller than Th1', greater than or equal to Th1' and smaller than Th1, or greater than Th1, and the discrimination target pixel GL(i,j) is classified into a plurality of groups. More specifically, if |GL(i,j)−GL(5,5)|<Th1', the discrimination target pixel GL(i,j) is classified into the flat region group, if Th1'≤|GL(i,j)−GL(5,5)|<Th1, the target pixel GL(i,j) is classified into an intermediate group between the flat region and signal region groups, and if Th1<|GL(i,j)−GL(5,5)|, the target pixel GL(i,j) is classified into the signal region group. In this case, each pixel classified into the intermediate group is assumed to correspond to one-half the pixel classified into the flat region in terms of counting, and may be added to the number "k" of the pixels classified into the flat region.

Further, in the first embodiment, all of the pixels of the color component images RL, GL, and BL are classified first in the signal classification section 64, and noise reduction processing is performed after that in the processing section 65. Alternatively, signal classifying result in the signal classification section 64 may be sequentially outputted, and noise reduction processing may be sequentially performed on the target pixels in the processing section 65.

Figure 13:
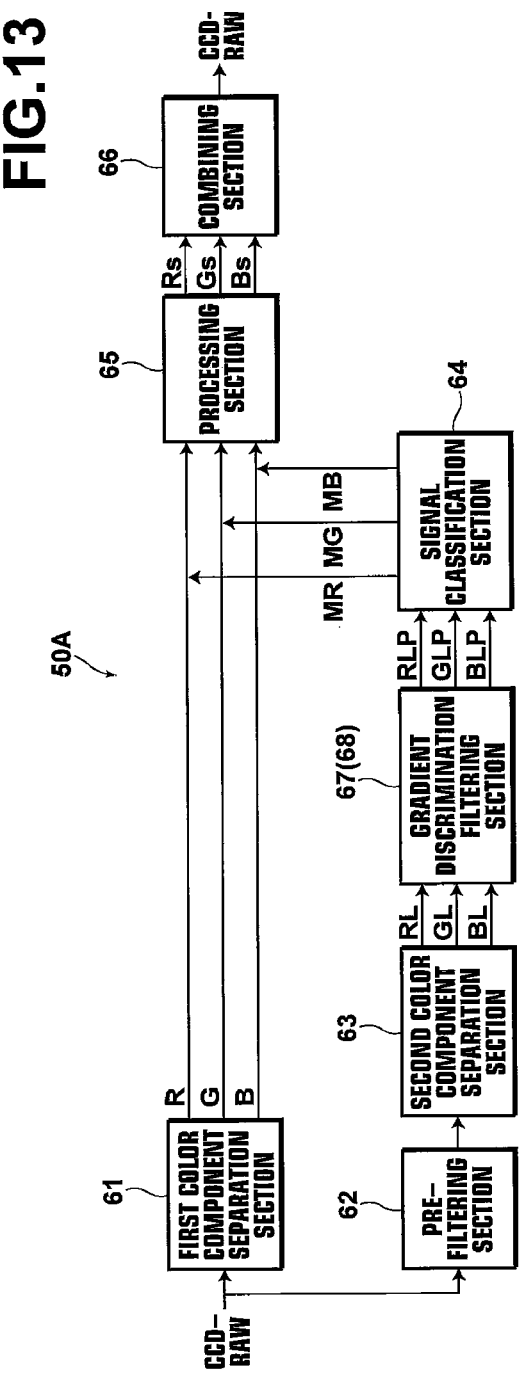
FIG. 13 is a schematic block diagram of a noise reduction section according to a second embodiment, illustrating the construction thereof.

Next, a second embodiment of the present invention will be described. In the second embodiment, only the configuration of the noise reduction section is different from that of the first embodiment. Therefore, only the difference from the first embodiment will be described hereinafter. FIG. 13 is a schematic block diagram of a noise reduction section according to the second embodiment, illustrating the construction thereof. In FIG. 13, components identical to those in FIG. 5 are given the same reference numerals, and will not be elaborated upon further here. The noise reduction section 50A according to the second embodiment differs from the noise reduction section 50 according to the first embodiment, in that it has a gradient discrimination filtering section 67 between the second color separation section 63 and signal classification section 64.

The gradient discrimination filtering section 67 receives color component images RL, GL, and BL outputted from the second color component separation section 63, and detects a direction in which variance of the signal values is smallest of the four directions of horizontal (H direction), vertical (v direction), upper right to lower left (NE direction), and upper left to lower right (NW direction) with respect to each pixel of the color component images RL, GL, and BL, and performs filtering processing on the direction in which variance of the signal values is smallest using a low-pass filter.

FIG. 14 is a conceptual diagram illustrating processing performed by a gradient discrimination filtering section 67 in the second embodiment. As illustrated in FIG. 14, the gradient discrimination filtering section 67 performs filtering processing on each pixel of the color component images RL, GL, and BL by high-pass filtering (H-pass) sections 70A to 70D in the H, V, NE and NW directions respectively, and calculates their absolute values by absolute value calculation sections (abs) 71A to 71D as evaluation values Q_H, Q_V, Q_NE, and Q_NW respectively.

Here, if the CCD 18 is a CCD having the honeycomb arrangement shown in FIG. 2, the filtering processing by the high-pass filters (high-pass filtering processing) is filtering processing using each pixel adjacent to the target pixel located in the center, as shown in FIG. 15A. If the CCD 18 is a CCD having the Beyer arrangement shown in FIG. 3, the filtering processing by the high-pass filters is filtering processing using each pixel adjacent to the target pixel, as shown in FIG. 15B.

The high-pass filtering processing for the honeycomb arrangement CCD 18 and for the Beyer arrangement CCD 18 is shown in formulae (11) to (14), and formulae (15) to (18) below respectively. In formulae (11) to (14), the suffix (0,0) denotes the coordinates of the target pixel, and the suffix (i,j) (i,j=−2 to 2, i indicates horizontal directions, and j indicates vertical directions) denotes the coordinates of a pixel around the target pixel. In addition, "b" is the filter coefficient of the high-pass filter. As for the high-pass filter, for example, a first derivative filter of $(b_{-1}, b_0, b_1)=(-1, 0, 1)$ or a second derivative filter of $(b_{-1}, b_0, b_1)=(-1, 2, -1)$. Here, the description will be made only for green color component, since red and blue color components maybe processed in the same manner as the green color component.

$$Q\_H=|b_{-1}*GL_{-2,0}+b_0*GL_{0,0}+b_1*GL_{2,0}| \quad (11)$$

$$Q\_V=|b_{-1}*GL_{0,-2}+b_0*GL_{0,0}+b_1*GL_{0,2}| \quad (12)$$

$$Q\_NE=|b_{-1}*GL_{-1,1}+b_0*GL_{0,0}+b_1*GL_{1,1}| \quad (13)$$

$$Q\_NW=|b_{-1}*GL_{-1,-1}+b_0*GL_{0,0}+b_1*GL_{1,1}| \quad (14)$$

$$Q\_H=|b_{-1}*GL_{-1,0}+b_0*GL_{0,0}+b_1*GL_{1,0}| \quad (15)$$

$$Q\_V=|b_{-1}*GL_{0,-0}+b_0*GL_{0,0}+b_1*GL_{0,1}) \quad (16)$$

$$Q\_NE=|b_{-1}*GL_{-1,1}+b_0*GL_{0,0}+b_1*GL_{1,-1}) \quad (17)$$

$$Q\_NW=|b_{-1}*GL_{-1,-1}+b_0*GL_{0,0}+b_1*GL_{1,1}) \quad (18)$$

Then, a direction where the smallest value of the evaluation values Q_H, Q_V, Q_NE, and Q_NW is calculated is determined in a selector 72 to be the direction in which variance of the signal values is smallest, and filtering processing by a low-pass filter is performed on the direction in which variance of the signal values is smallest by a low-pass filtering (L-pass) section 73 to output processed color component images RLP, GLP, and BLP. Following formulae (19) to (22) represent low-pass filtering in the H, V, NE and NW directions respectively when the CCD 18 has the honeycomb arrangement, and formulae (23) to (26) represent low-pass filtering in the H, V, NE and NW directions respectively when the CCD 18 has the Beyer arrangement.

$$GLP_{0,0}\_H=(c_{-1}*GL_{-2,0}+C_0*GL_{0,0}+c_1*GL_{2,0}+1.5)/3 \quad (19)$$

$$GLP_{0,0}\_V=(c_{-1}*GL_{0,-2}+C_0*GL_{0,0}+c_1*GL_{0,2}+1.5)/3 \quad (20)$$

$$GLP_{0,0}\_NE=(c_{-1}*GL_{-1,1}+C_0*GL_{0,0}+c_1*GL_{1,-1}+1.5)/3 \quad (21)$$

$$GLP_{0,0}\_NW=(c_{-1}*GL_{-1,-1}+C_0*GL_{0,0}+c_1*GL_{1,1}+1.5)/3 \quad (22)$$

$$GLP_{0,0}\_H=(c_{-1}*GL_{-1,0}+C_0*GL_{0,0}+c_1*GL_{1,0}+1.5)/3 \quad (23)$$

$$GLP_{0,0}\_V=(c_{-1}*GL_{0,-1}+C_0*GL_{0,0}+c_1*GL_{0,1}+1.5)/3 \quad (24)$$

$$GLP_{0,0}\_NE=(c_{-1}*GL_{-1,1}+C_0*GL_{0,0}+c_1*GL_{1,-1}+1.5)/3 \quad (25)$$

$$GLP_{0,0}\_NW=(c_{-1}*GL_{-1,-1}+C_0*GL_{0,0}+c_1*GL_{1,1}+1.5)/3 \quad (22)$$

In formulae (19) to (26), the reason for the addition of the value of 1.5 is to give the round-off effect when divided by the value of 3. Further, in formulae (19) to (26), "c" is the filter coefficient of the low-pass filter, and, for example, $(c_{-1}, c_0, c_1)=(1, 1, 1)$ is used.

The color component images RLP, GLP, and BLP obtained by the gradient discrimination filtering section 67 in the manner as described above are inputted to the signal classification section 64, and the signal classifying processing and noise reduction processing are performed thereon as in the first embodiment.

Here, as described above, noise in CCD-RAW data may be reduced to a certain extent by performing pre-filtering processing. However, if a large amount of noise is contained in CCD-RAW data, as in particularly high sensitivity photographing, the noise can not be reduced satisfactorily by the pre-filtering processing. As a result, the signal classifying processing can not be performed accurately. In this case, it is conceivable to increase the blur level when performing the pre-filtering processing, but if the blur level is increased, an edge or the like included in the CCD-RAW data is also blurred, so that the signal classifying processing can not be performed accurately after all.

In the second embodiment, a direction in which variance of the signal values is smallest is detected with respect to the color component images RL, GL, and BL, and filtering processing is performed on the direction in which variance of the signal values is smallest by a low-pass filter. This may cause the color component images RL, GL, and BL to be further blurred, but the direction to be blurred does not cross the edge, so that only the noise may be reduced without blurring the edge. Accordingly, only noise may be reduced without blurring edges, so that even when high sensitivity photographing is performed, signal classifying processing required for the subsequent noise reduction processing may be performed accurately.

Next, a third embodiment of the present invention will be described. In the third embodiment, only the configuration of the gradient discrimination filtering section is different from that of the second embodiment. Therefore, only the difference from the second embodiment will be described hereinafter.

Whereas the gradient discrimination filtering section 67 according to the second embodiment uses only one type of high-pass filter for calculating each of the gradient evaluation values Q_H, Q_V, Q_NE, and Q_NW, a gradient discrimination filtering section 68 according to the third embodiment uses two types of high-pass filters having different frequency characteristics for calculating each of the gradient evaluation values Q_H, Q_V, Q_NE, and Q_NW.

FIG. 16 is a conceptual diagram illustrating processing performed by the gradient discrimination filtering section 68 according to the third embodiment. As illustrated in FIG. 16, the gradient discrimination filtering section 68 performs filtering processing on each pixel of the color component images RL, GL, and BL by first high-pass filtering (H-pass1) sections 75A to 75D in the H, V, NE, and NW directions respectively, and calculates their absolute values by absolute value calculation sections (abs) 76A to 76D as evaluation values Q_H1, Q_V1, Q_NE1, and Q_NW1 respectively. Further, it performs filtering processing on each pixel of the color component images RL, GL, and BL by second high-pass filtering (H-pass2) sections 77A to 77D in the H, V, NE and NW directions respectively, and calculates their absolute values by absolute value calculation sections (abs) 78A to 78D as evaluation values Q_H2, Q_V2, Q_NE2, and Q_NW2 respectively.

Then, the first gradient evaluation values Q_H1, Q_V1, Q_NE1, and Q_NW1 and second gradient evaluation values Q_H2, Q_V2, Q_NE2, and Q_NW2 are weight added by adder sections 79A to 79D respectively, as shown in formulae (27) to (30).

$$Q\_H=(w*Q\_H1+(1-w)*Q\_H2+1)/2 \quad (27)$$

$$Q\_V=(w*Q\_V1+(1-w)*Q\_V2+1)/2 \quad (28)$$

$$Q\_NE=(w*Q\_NE1+(1-w)*Q\_NE2+1)/2 \quad (29)$$

$$Q\_NW=(w*Q\_NW1+(1-w)*Q\_NW2+1)/2 \quad (30)$$

Here, the reason for the addition of the value of 1 is to give the round-off effect when divided by the value of 2.

Then, a direction in which a smallest value of the evaluation values Q_H, Q_V, Q_NE, and Q_NW is calculated is determined in a selector 80 to be the direction in which variance of the signal values is smallest, and filtering processing by a low-pass filter is performed on the direction in which variance of the signal values is smallest by a low-pass filtering (L-pass) section 81 to output processed color component images RLP, GLP, and BLP, as in the second embodiment.

Figure 17:
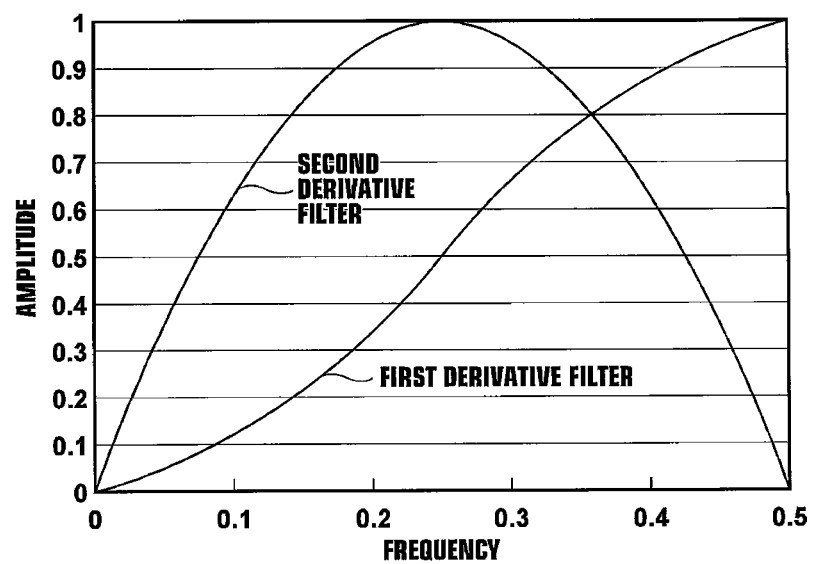
FIG. 17 illustrates amplitude characteristics of a first derivative filter and a second derivative filter.

Here, as for the first high-pass filter, for example, a first derivative filter having a filter coefficient of $(b_{-1}, b_0, b_1)=(-1, 0, 1)$ may be used, and as for the second high-pass filter, for example, a second derivative filter having a filter coefficient of $(b_{-1}, b_0, b_1)=(-1, 2, -1)$ may be used. FIG. 17 illustrates amplitude characteristics of the first and second derivative filters. It is noted that the frequency on the horizontal axis in FIG. 17 is the frequency normalized by the sampling frequency. As illustrated in FIG. 17, comparison of amplitude characteristics between the first and second derivative filters shows that the first derivative filter may detect a signal value gradient like a gradation, but it is not suitable for the detection of a gradient like a fine pattern. Whereas, the second derivative filter is not suitable for the detection of a gradient like a gradation, but it is suitable for the detection of a gradation like a fine pattern.

In the third embodiment, the gradient evaluation values Q_H1, Q_V1, Q_NE1, and Q_NW1 calculated using the first derivative filters and second gradient evaluation values Q_H2, Q_V2, Q_NE2, and Q_NW2 calculated using the second derivative filters are weight added, so that gradient variations that can be detected may be increased. Accordingly, various different variations in the signal values included in the color component images RL, GL, and BL may be detected.

In the third embodiment, the gradient evaluation values Q_H1, Q_V1, Q_NE1, and Q_NW1 obtained by the first derivative filters and second gradient evaluation values Q_H2, Q_V2, Q_NE2, and Q_NW2 obtained by the second derivative filters are weight added. Alternatively, a greater value between each of the gradient evaluation values Q_H1, Q_V1, Q_NE1, and Q_NW1 obtained by the first derivative filters and each of the second gradient evaluation values Q_H2, Q_V2, Q_NE2, and Q_NW2 obtained by the second derivative filters may be used as the final evaluation value.

In the first to third embodiment described above, the processing shown in the flowchart of FIG. 12 is performed as the noise reduction processing. But the noise reduction processing is not limited to this and any processing may be used as long as it uses signal classifying processing result. For example, the noise reduction processing may be performed through filtering processing using a low-pass filter on a target pixel classified into the flat region.

Further, in the first to third embodiment, a determination is made as to whether to use signal variance value $\sigma^2_{MG}$ or noise variance value $\sigma^2_{nMG}$ in formula (10) according to the ratio of the noise variance value $\sigma^2_{nMG}$ to the signal variance value $\sigma^2_{MG}$, $\sigma^2_{MG}/\sigma^2_{nMG}$ in the noise reduction processing. Alternatively, the determination may be made according to a difference or an absolute difference between the signal variance value $\sigma^2_{MG}$ and noise variance value $\sigma^2_{nMG}$.

As described above, embodiments of the signal classifying apparatus and noise reduction apparatus are applied to digital cameras. Alternatively, they may be provided as stand-alone apparatuses that respectively perform signal classifying processing and noise reduction processing on CCD-RAW data obtained by a digital camera in the same manner as described above. A program for causing a computer to function as the means corresponding to the pre-filtering section 62, color component separation section 63, signal classification section 64, and processing section 65, thereby causing the computer to perform processing like that illustrated in FIGS. 6, 10, and 12 is another embodiment of the present invention. Further, a computer readable recording medium on which such program is recorded is still another embodiment of the present invention.

What is claimed is:

1. A signal processing apparatus, comprising:
    a first noise reduction processing section that performs first noise reduction processing on an image, in which a multitude of pixels has a predetermined pixel arrangement, each pixel of the multitude of pixels has one of a plurality of color components and the color components are distributed regularly, the first noise reduction processing being performed based on the signal values of target pixels which are targets of noise reduction, and the signal values of pixels located in the periphery of the target pixels, wherein said pixels located in the periphery of the target pixels include pixels having color components different from those of the target pixels, to obtain a first processed image;
    a color component separation section that separates the first processed image into each of the color components to obtain a plurality of color component images; and
    a signal classification section that compares a signal value of a target pixel for processing with a signal value of each pixel included in a predetermined range of area around the target pixel and classifies each pixel within the predetermined range of area into one of a plurality of groups based on the comparison result,
    wherein the signal classification section sets the target pixel as a processing target of a second noise reduction only when the number of pixels classified into a group having relatively small signal values within the predetermined range of area around the target pixel exceeds a predetermined threshold value.

2. The signal processing apparatus according to claim 1, wherein the signal classification section is a section that classifies each pixel within the predetermined range of area into a flat region group having a relatively small variance of the signal values or a signal region group having a relatively large variance of the signal values according to the comparison result.

3. The signal processing apparatus according to claim 1, wherein the first noise reduction processing is filtering processing by a low-pass filter on each of the pixels in the image.

4. The signal processing apparatus according to claim 1, wherein:
    the apparatus further comprises a second noise reduction processing means that performs second noise reduction processing on each of the color component images according to a variance direction of the signal values in each of the pixels in each of the color component images; and
    the signal classification means is a means that performs the signal classification processing on each of the color component images subjected to the second noise reduction processing.

5. The signal processing apparatus according to claim 4, wherein the second noise reduction processing means is a means that performs the second noise reduction processing by performing filtering processing on each of the pixels in each of the color component images in a plurality of predetermined directions by a high-pass filter to detect a direction in which the variance of the signal values is smallest based on the filtering result, and performing filtering by a low-pass filter on the direction in which the variance of the signal values is smallest.

6. The signal processing apparatus according to claim 4, wherein the second noise reduction processing means is a means that performs the second noise reduction processing by performing filtering processing by a plurality of types of high-pass filters having different frequency characteristics from each other on each of the pixels in each of the color component images in a plurality of predetermined directions to obtain a plurality of filtering results, detecting a direction in which the variance of the signal values is smallest based on the plurality of filtering results, and performing filtering by a low-pass filter on the direction in which the variance of the signal values is smallest.

7. A noise reduction apparatus, comprising an image noise reduction section that performs noise reduction processing, based on the classification result of the signal classification processing performed by the signal processing apparatus according to claim 1, on each of the color component images.

8. The noise reduction apparatus according to claim 7, wherein the noise reduction means is a means that shifts the level of a signal value of a target pixel for processing such that a mean value of the signal value of the target pixel and a signal value of each pixel included in a predetermined range of area around the target pixel in each of the color component images corresponds to the position of origin of a color space of each of the plurality of color components, performs a calculation of noise reduction on the shifted target pixel according to the level, and restores the level according to the amount of the shift.

9. The noise reduction apparatus according to claim 8, wherein the noise reduction means is a means that estimates the amount of noise in the target pixel, calculates a statistical value representing the amount of noise in the target pixel based on a signal value of the target pixel and a signal value of each pixel included in a predetermined range of area around the target pixel, compares the estimated amount of noise with the statistical value, and determines whether to use the estimated amount of noise or the statistical value in the calculation of noise reduction based on the comparison result.

10. The noise reduction apparatus according to claim 8, wherein the mean value is a mean value of the signal values of pixels classified into the group having a relatively small signal value within the predetermined range of area.

11. The noise reduction apparatus according to claim 7, wherein the noise reduction means is a means that performs noise reduction processing on the target pixel only when the number of pixels classified into the group having a relatively small signal value within the predetermined range of area around the target pixel exceeds a predetermined threshold value.

12. A signal processing method, comprising the steps of:
performing a first noise reduction processing on an image, in which a multitude of pixels has a predetermined pixel arrangement, each pixel of the multitude of pixels has one of a plurality of color components and the color components are distributed regularly, the first noise reduction processing being performed based on the signal values of target pixels which are targets of noise reduction, and the signal values of pixels located in the periphery of the target pixels, wherein said pixels located in the periphery of the target pixels include pixels having color components different from those of the target pixels, to obtain a first processed image;
separating the first processed image into each of the color components to obtain a plurality of color component images; and
comparing a signal value of a target pixel for processing with a signal value of each pixel included in a predetermined range of area around the target pixel, and classifying each pixel within the predetermined range of area into one of a plurality of groups based on the comparison result,
wherein the target pixel is set as a processing target of a second noise reduction only when, according to said pixel classifying, the number of pixels classified into a group having relatively small signal values within the predetermined range of area around the target pixel exceeds a predetermined threshold value.

13. A noise reduction method, comprising the step of performing noise reduction processing, based on the classification result of the signal classification processing of the signal processing method according to claim 12, on each of the color component images.

14. A computer readable recording medium on which a program for causing a computer to perform a signal processing method is recorded, the method comprising the steps of:
performing a first noise reduction processing on an image, in which a multitude of pixels has a predetermined pixel arrangement, each pixel of the multitude of pixels has one of a plurality of color components and the color components are distributed regularly, the first noise reduction processing being performed based on the signal values of target pixels which are targets of noise reduction, and the signal values of pixels located in the periphery of the target pixels, wherein said pixels located in the periphery of the target pixels include pixels having color components different from those of the target pixels, to obtain a first processed image;
separating the first processed image into each of the color components to obtain a plurality of color component images; and
comparing a signal value of a target pixel for processing with a signal value of each pixel included in a predetermined range of area around the target pixel, and classifying each pixel within the predetermined range of area into one of a plurality of groups based on the comparison result,
wherein the target pixel is set as a processing target of a second noise reduction only when, according to said pixel classifying, the number of pixels classified into a group having relatively small signal values within the predetermined range of area around the target pixel exceeds a predetermined threshold value.

15. A computer readable recording medium on which a program for causing a computer to perform a noise reduction method is recorded, the method comprising the step of performing noise reduction processing, based on the classification result of the signal classification processing of the signal processing method according to claim 12, on each of the color component images.

* * * * *